United States Patent [19]
Jepson

[11] Patent Number: 5,507,858
[45] Date of Patent: Apr. 16, 1996

[54] LIQUID/GAS SEPARATOR AND SLUG FLOW ELIMINATOR AND PROCESS FOR USE

[75] Inventor: William P. Jepson, Athens, Ohio

[73] Assignee: Ohio University, Athens, Ohio

[21] Appl. No.: 312,032

[22] Filed: Sep. 26, 1994

[51] Int. Cl.$^6$ .................................................. B01D 19/00
[52] U.S. Cl. .............................. 95/262; 96/206; 96/207; 96/215; 96/220
[58] Field of Search ...................... 95/242, 248, 260–262, 95/247, 252; 96/176, 197, 198, 206, 207, 215, 220, 204, 194; 166/267, 357

[56] References Cited

U.S. PATENT DOCUMENTS

| | | | |
|---|---|---|---|
| 3,385,031 | 5/1968 | McMinn | 96/191 |
| 3,570,221 | 3/1971 | Oliver | 55/418 |
| 3,688,473 | 9/1972 | Brown | 95/253 |
| 3,960,525 | 6/1976 | Coggins | 55/320 X |
| 4,397,659 | 8/1983 | Gowan et al. | 96/198 X |
| 4,435,196 | 3/1984 | Pielkenrood | 96/184 |
| 4,760,742 | 8/1988 | Hatton | 73/861.04 |
| 5,051,116 | 9/1991 | Mattsson | 95/260 |
| 5,232,475 | 8/1993 | Jepson | 55/276 X |

FOREIGN PATENT DOCUMENTS

| | | |
|---|---|---|
| 55-3962 | 1/1980 | Japan . |
| 1606145 | 11/1990 | U.S.S.R. . |
| 931735 | 7/1963 | United Kingdom ............. 96/220 |
| 2153251 | 7/1987 | United Kingdom . |
| 2222961 | 3/1990 | United Kingdom . |
| 2231507 | 11/1990 | United Kingdom . |
| 2239193 | 6/1991 | United Kingdom . |
| 8701759 | 3/1987 | WIPO . |

OTHER PUBLICATIONS

Potter, Neil, "Subsea First for Argyll," *The Oilman*, May 1988, pp. 16–17.
"Highlander Gets First Subsea Slug Catcher for Marginal-Field Development," *Oil and Gas Journal*, Nov. 11, 1985, pp. 58–59.
Handout—"Subsea Slug Catching," Taylor Forge Canada Inc., pp. 1–8, undated.

*Primary Examiner*—Richard L. Chiesa
*Attorney, Agent, or Firm*—Killworth, Gottman, Hagan & Schaeff

[57] ABSTRACT

An apparatus and method for separating the liquid phase and the gas phase of a liquid/gas mixture and for substantially eliminating slug flow is provided. The apparatus includes a housing containing a separation table positioned in an inclined position within the housing. The liquid/gas mixture flows into the housing through an inlet and spreads over the surface of the separation table. As the mixture spreads over the table, entrained gas is released and the liquid is decelerated. The separated liquid and gas then pass through orifices in the separation table and are separately discharged from the housing. In a second version, a plurality of separation tables may be contained in the housing.

18 Claims, 3 Drawing Sheets

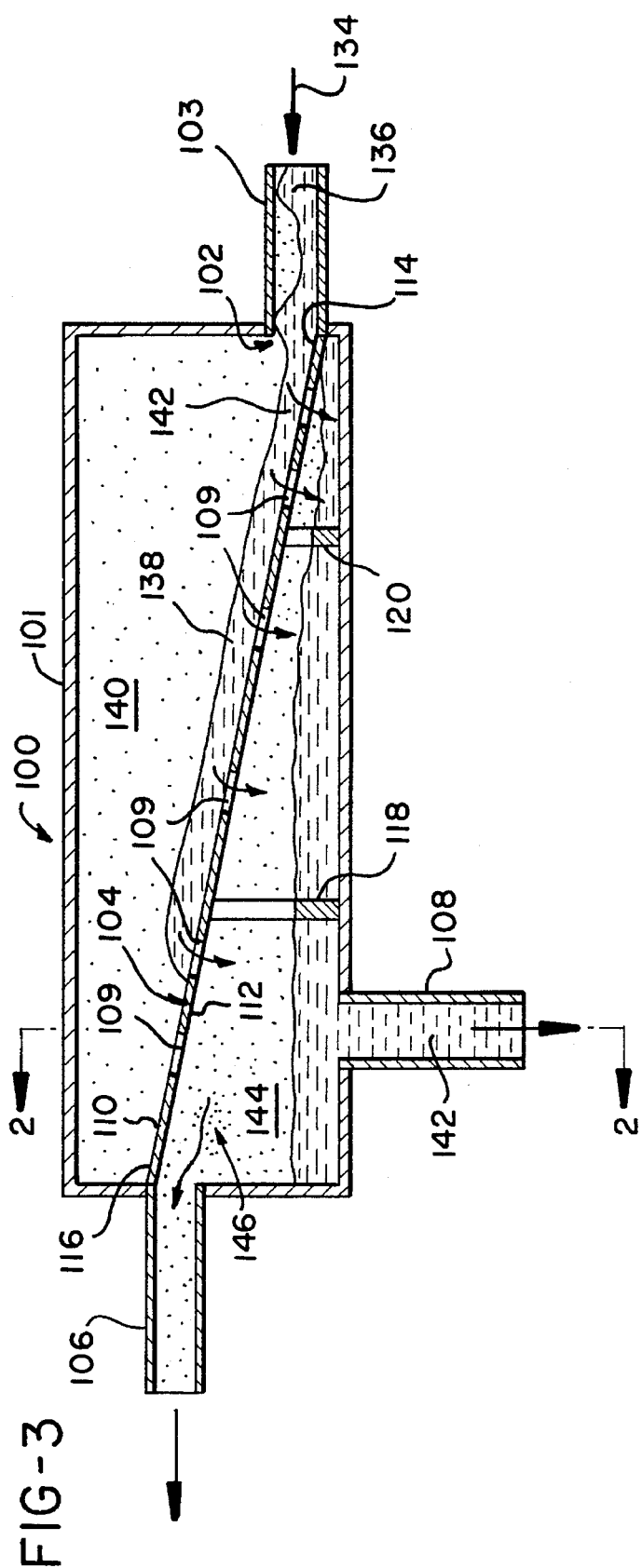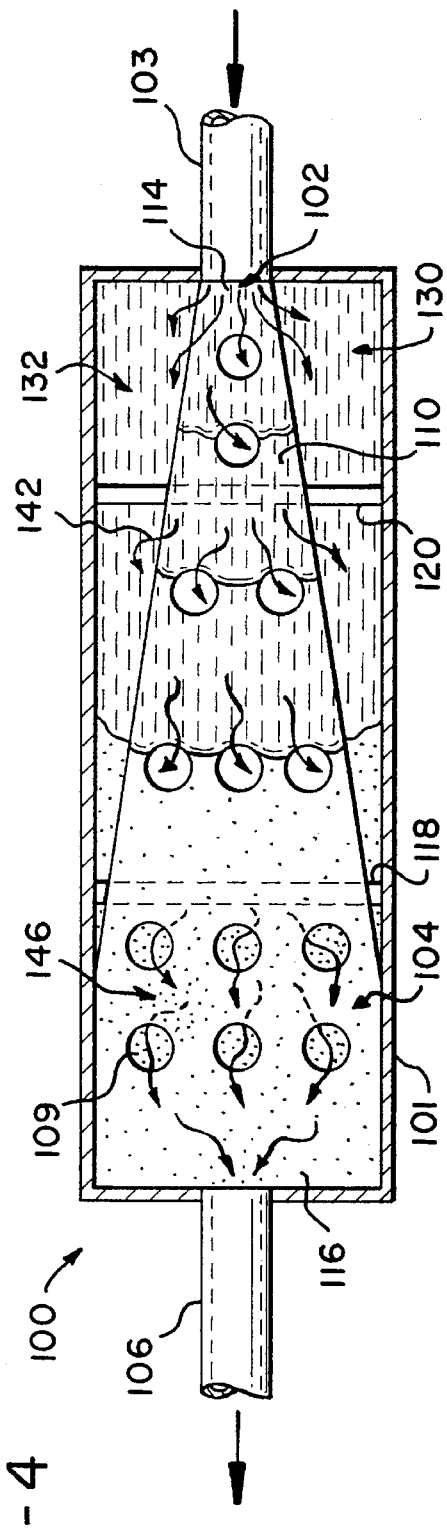

LIQUID/GAS SEPARATOR AND SLUG FLOW ELIMINATOR AND PROCESS FOR USE

BACKGROUND OF THE INVENTION

The present invention relates to an apparatus and method for separating liquid and gas in a liquid/gas mixture and for eliminating slug flow in pipelines transporting such a mixture. More particularly, the present invention relates to an apparatus and method for separating the liquid and the gas of a mixture of petroleum liquids and natural gas in a pipeline and for eliminating slug flow in the pipeline.

When liquid/gas mixtures move through a pipeline, the flow can take several configurations. At low liquid and low gas flow rates, the flow is generally stratified such that the gas phase flows above the liquid phase. At higher flow rates, the liquid and gas becomes mixed and a relatively high percentage of the gas may become entrained in the liquid. For instance, natural gas is frequently "wet" natural gas which is natural gas interspersed with a liquid hydrocarbon mixture under certain conditions in the pipeline. The presence of liquid "slugs" in the pipeline significantly increases the degree of mixture between the liquid and gas.

Waves form at the gas/liquid interface at higher flow rates. If the gas flow rates are high enough, the waves, termed slugs, can grow to the point where they fill the cross-section of the pipeline, blocking the gas flow. Inasmuch as the flow rate of the gas phase is much higher than that of the liquid phase, the liquid slugs are accelerated by the gas phase to approximately the same velocity as the gas phase. The slugs thus travel at a much higher flow rate than the non-slug portion of the liquid phase. As a result, the piping and related equipment downstream of the slugs experience intermittent surges and subsequent impact from the slugs. As can be appreciated, such surging places tremendous stresses on the piping and process equipment.

It is well known to those skilled in the art that the stresses placed on oil pipelines by slug flow is a leading cause of their failure. Such stresses not only damage the pipelines and related equipment, but vibrations, abrupt pressure changes, and flow characteristics lead to corrosion in the piping and downstream equipment. To minimize such deleterious effects, crude oil is pumped at flow rates which are lower than the maximum potential output of the wells. However, this is undesirable from an economic standpoint since profitability of each well is directly proportional to the flow rate of petroleum therefrom. Thus, it is seen that there is a strong need for an improved liquid/gas separator and slug flow eliminator for use in petroleum pipelines.

When petroleum is pumped from an undersea well to a gathering station, the gas phase must be separated from the liquid phase so that both phases can be processed separately. Currently, large separator tanks with vertical baffles are used for this purpose. As is known in the art, oceanic gathering station space is at a premium. The separator tanks currently in use, typically measuring 20 feet by 80 feet, take up large amounts of such space. In addition, such tanks are not equipped to handle severe slug flow. The vertical baffles are frequently destroyed by slugs of liquid impinging upon them and must be replaced. What is needed in this regard is a compact liquid/gas separator which is equipped to handle slug flow.

One such vertical tank separator is disclosed in U.K. Patent No. GB 2231507 A, issued to the United Kingdom Atomic Energy Authority. The separator consists of an upright cylindrical tank having a perforated plate horizontally mounted therein. A liquid/gas mixture enters the tank through an inlet pipe located above the plate. The liquid impacts against a vertical baffle plate mounted in the perforated plate and spreads out over the surface of the perforated plate. The gas separates from the liquid and exits the tank through a vertically mounted gas outlet pipe. The liquid passes through the perforated plate and/or between the edges of the table and the pipe wall into the lower portion of the tank and exits through a liquid outlet pipe.

A significantly improved slug flow eliminator and liquid/gas separator is disclosed in commonly assigned U.S. Pat. No. 5,232,475, issued to Jepson, the disclosure of which is hereby incorporated by reference. This separator consists of a housing enclosing a horizontal deceleration table having a plurality of orifices therein to decelerate liquid slugs and to separate the liquid and gas. Upon entering the housing, the liquid/gas mixture spreads out over the surface of the deceleration table and thereby decelerates. The decelerated liquid falls through the orifices and exits the housing through a liquid outlet. The separated gas rises above the deceleration table and is separately discharged from the housing. Although the aforedescribed Jepson slug flow eliminator is an improvement over prior separators, there is still a need for alternative methods of efficiently and inexpensively separating the liquid and gas phases and eliminating slug flow in a pipeline.

Accordingly, a need still exists in the art for an improved in-line liquid/gas separator and slug flow eliminator which is efficient, compact and inexpensive to manufacture, maintain and install.

SUMMARY OF THE INVENTION

That need is met by the present invention which provides an in-line liquid/gas separator and slug flow eliminator which is relatively inexpensive, compact, lightweight, and easy to handle. Such features allow the present separator to be easily installed and removed and thus facilitate its reuseability. The present separator provides for both efficient separation of liquid and gas in a liquid/gas mixture and uniform, gradual deceleration of liquid slugs to decrease foaming.

According to one aspect of the present invention, an apparatus for separating gas and liquid in a liquid/gas mixture flowing through a pipeline is provided. The apparatus includes a housing connected to the pipeline and including at least one inlet for receiving the liquid/gas mixture from the pipeline. At least one liquid outlet is provided in the housing for discharging the liquid from the housing. The housing further includes at least one vapor outlet for discharging the gas from the housing. Contained within the housing is at least one separation table for separating the gas and the liquid in the liquid/gas mixture. Each of the separation tables have upper and lower surfaces, a first end positioned toward the inlet, a second end opposite the first end and a plurality of orifices through which the liquid and the gas from the liquid/gas mixture passes. The separation table extends generally longitudinally along the housing in an inclined position such that the first end is below the second end.

Preferably, the inlet and the vapor outlet are positioned at opposite ends of the housing and the separation table extends substantially from the inlet to the vapor outlet within the housing. The upper surface of the first end of the separation table preferably abuts the bottom of the inlet and the lower surface of the second end of the separation table abuts the top of the vapor outlet.

The separation table may be supported within the housing by at least two supporting legs.

To ensure that the liquid entering the housing contacts the separation table without sloshing or increased level of turbulence, the upper surface of the first end of the separation table may abut the bottom of the inlet. The separation table may comprise a first separation table for receiving the liquid/gas mixture from the inlet, and a second separation table for receiving the gas and the liquid of the liquid/gas mixture from the first separation table.

In this version, the upper surface of the first end of the first separation table may abut the bottom of the inlet. Preferably, the lower surface of the second end of the second separation table abuts the top of the vapor outlet. The liquid outlet may be positioned beneath the second separation table to discharge the separated liquid from the housing. A plurality of supporting legs may support the first and second separation tables.

In accordance with another aspect of the present invention, a method for separating a liquid and a gas in a liquid/gas mixture flowing through a pipeline is provided. The method comprises the steps of: providing a housing having at least one separation table therein, each of the at least one separation table having upper and lower surfaces, a first end positioned toward the inlet, a second end opposite the first end and a plurality of orifices through which the liquid and the gas from the liquid/gas mixture passes, the at least one separation table extending generally longitudinally along the housing in an inclined position such that the first end is below the second end; directing the liquid/gas mixture from the pipeline onto the at least one separation table for separating the liquid and the gas of the liquid/gas mixture; discharging the gas through at least one vapor outlet in the housing; and discharging the liquid through at least one liquid outlet in the housing.

Preferably, the step of providing a housing comprises the steps of: providing the inlet and the vapor outlet on opposite ends of the housing; and providing a separation table generally extending from the inlet to the vapor outlet. The step of providing a separation table may comprise the step of providing the upper surface of the first end of the separation table abutting the bottom of the inlet. The step of providing a separation table preferably further comprises the step of providing the lower surface of the second end of the separation table abutting the top of the vapor outlet.

The step of providing at least one separation table may comprise the steps of: providing a first separation table for receiving the liquid/gas mixture from the inlet; and providing a second separation table for receiving the gas and the liquid of the liquid/gas mixture from the first separation table. The step of providing a first separation table may comprise the step of providing the upper surface of the first end of the first separation table so that it abuts the bottom of the inlet. The step of providing a second separation table may further comprise the step of providing the lower surface of the second end of the second separation table so that it abuts the top of the vapor outlet.

Accordingly, it is a feature of the present invention to provide an in-line liquid/gas separator and slug flow eliminator which is inexpensive, easy to maneuver and re-useable, and which does not produce foaming or an emulsion. It is a further feature to provide a liquid/gas separator for use at a gathering station which is both compact and able to eliminate slug flow. These and other features and advantages of the present invention will become apparent from the following detailed description, the accompanying drawings, and the appended claims.

BRIEF DESCRIPTION OF THE DRAWINGS

FIG. 3 is a side sectional view of the separator of FIG. 1 taken along view line 3—3 in FIG. 2.

FIG. 4 is a top longitudinal sectional view of the separator taken along view line 4—4 in FIG. 1.

DETAILED DESCRIPTION OF THE PREFERRED EMBODIMENT

Figure 1:
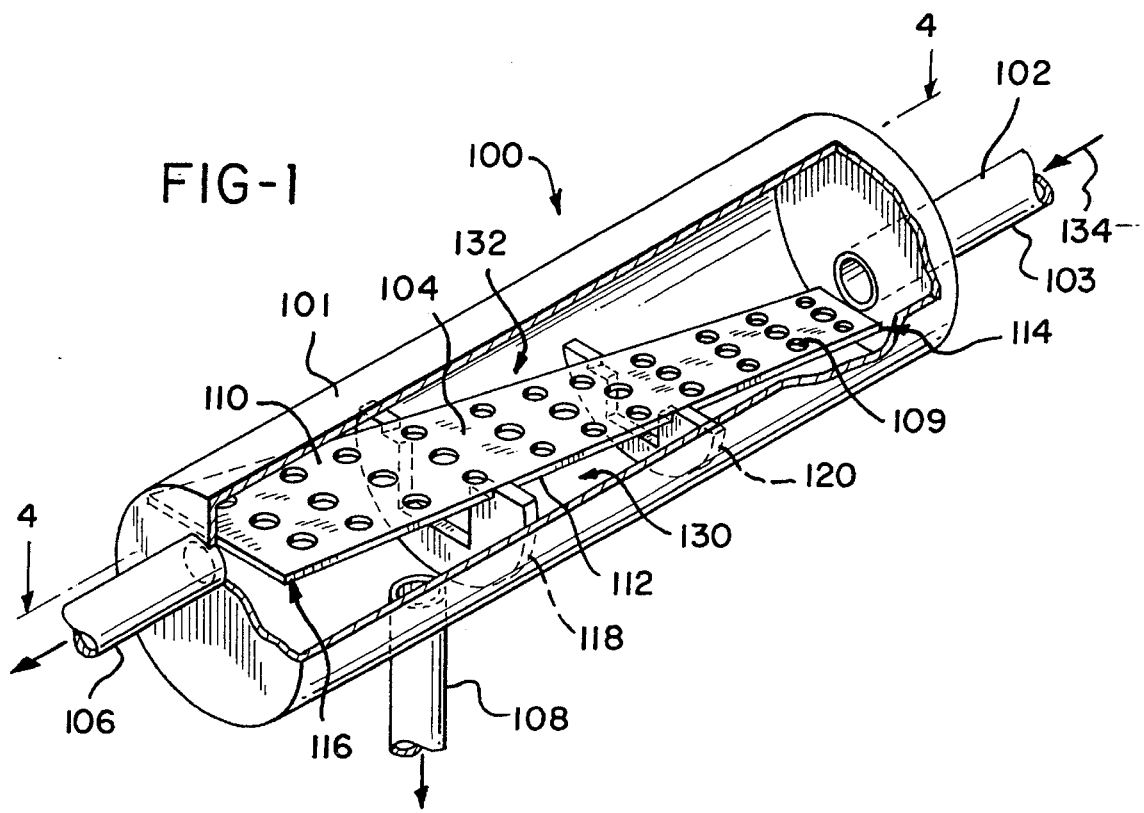
FIG. 1 is a cutaway perspective view of a liquid/gas separator containing a separation table in accordance with the present invention.

A liquid/gas separator 100 comprising a housing 101 having an inlet 102 connected to a pipeline 103 for receiving a liquid/gas mixture and a separation table 104 for separating liquid and gas in the liquid/gas mixture and for eliminating slug flow is shown in FIG. 1. As will be appreciated, the present liquid/gas separator 100 is uniquely suited for this role in that it is lightweight and inexpensive due to its simple design and can easily be installed and removed since its overall length can be made to be the length of a section of piping in the pipeline 103.

The liquid/gas eliminator 100 may be used, for example, on the deck of an oil drilling platform to separate the liquid and gas in a petroleum and natural gas mixture flowing through the pipeline 103. The liquid/gas eliminator 100 would serve a dual role on the oil drilling platform. It would substantially eliminate slugs of liquid flowing through the pipeline to prevent the equipment on the oil drilling platform from being damaged thereby and it would separate the liquid phase of the liquid/gas mixture from the gas phase thereof so that each phase could be separately processed on the oil drilling platform.

Referring again to FIG. 1, the housing 101 preferably consists of a generally cylindrical pipe section. The preferred material of construction for the housing 101 is any rigid material having high corrosion resistance such as 316 stainless steel. The separation table 104 contained in the housing 101 has upper and lower surfaces 110, 112, respectively, a first end 114 positioned toward the inlet 102 for receiving the liquid/gas mixture and a second end 116 opposite the first end 114. As shown clearly in FIG. 4, it is preferred that the first end 114 of the separation table 104 be narrower in width than the second end 116.

The housing 101 includes a vapor outlet 106 which is preferably positioned oppositely from the inlet 102 for discharging the separated gas. Liquid separated from the liquid/gas mixture discharges from the housing 101 through a liquid outlet 108 preferably positioned on the bottom of the housing 101.

The liquid and gas of the liquid/gas mixture pass through a plurality of orifices 109 in the separation table 104 to their respective liquid and vapor outlets 108, 106. The separation table 104 is mounted in an inclined position such that the first end 114 is below the second end 116. However, the separation table 104 is sufficiently horizontal to permit the force of gravity to draw the liquid through at least one of the plurality of orifices 109 or between the edges of the table and the pipe wall.

The orifices 109 should have sufficient surface area to allow the liquid to pass without impedance due to surface tension; however, the surface area should not be so large that substantially all of the liquid passes through the orifices 109 located near the inlet 102. The total number of the orifices 109 disposed in the separation table 104 is dependent upon the maximum expected liquid flow rate through the separator 100 such that the separation table 104 does not become flooded.

Preferably, the inlet 102 is located below the vapor outlet 106 with respect to the horizontal axis of the housing 101. The lower surface 112 of the second end 116 of the separation table 104 preferably abuts the top of the vapor outlet 106. The upper surface 110 of the first end 114 of the separation table 104 abuts the bottom of the inlet 102. This ensures that the liquid entering the inlet 102 impacts on the separation table 104 without sloshing or increasing the level of turbulence.

Figure 5:
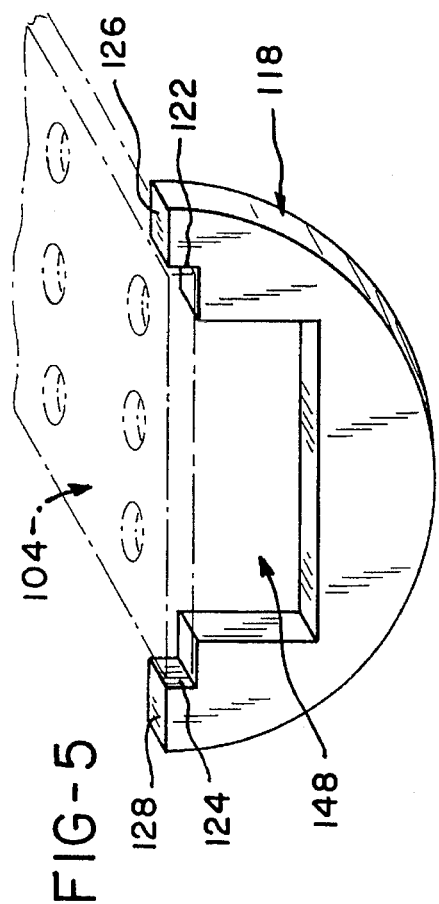
FIG. 5 is a perspective view of a supporting leg for supporting the separation table in the liquid/gas separator.

A pair of supporting legs 118, 120 support the separation table 104 in an inclined position in the housing 101. The preferred design of the supporting legs 118, 120 is shown in detail in FIG. 5. The supporting leg 118 includes a pair of seats 122, 124 between which the separation table 104 (shown in phantom) is disposed. A pair of flanges 126, 128 are interposed between the sides of the separation table 104 and the housing 101 to form two opposing overflow gaps 130, 132 (see FIGS. 2 and 4) through which the liquid and gas may flow. A liquid cavity 198 (see FIG. 5) is formed in the supporting leg 118 beneath the separation table 104 to permit flow of the liquid along the bottom of the housing 101. Those skilled in the art will readily realize that the separation table 104 may be mounted in many other manners, such as by welding or bolting it to the housing 101.

As one skilled in the art will readily comprehend, the actual physical dimensions of the liquid/gas separator 100 will be dependent upon the diameter of the pipeline and the anticipated maximum flow of the liquid/gas mixture. However, it has been shown experimentally that a liquid/gas separator including a housing having an inner diameter of 0.3m may be advantageously used in a pipeline with a diameter of 0.15m. The center of the inlet of the experimental separator was positioned 0.1m from the bottom of the housing, the gas outlet was centrally located opposite the inlet, and the liquid outlet had a 5 cm diameter and was located 0.3m from the end of the housing having the gas outlet. Two supporting legs centrally located 0.6m apart in the housing to support the separation table. The separation table contained orifices having a diameter of 25 mm and tapered from a second end of 22.5 cm near the gas outlet to a first end of 10 cm near the inlet.

Figure 2:
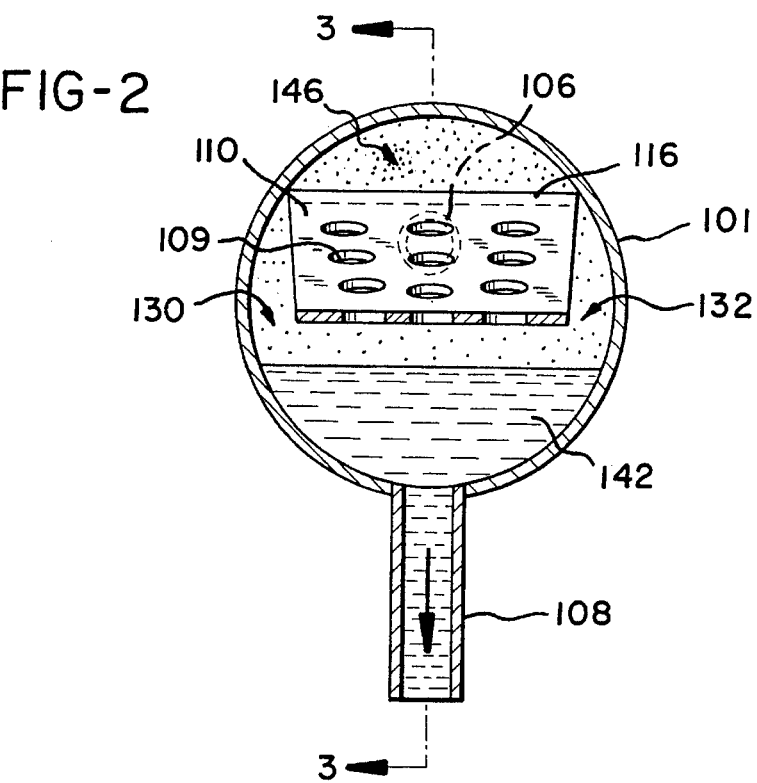
FIG. 2 is a cross sectional view of the separator of FIG. 1 taken along view line 2—2 in FIG. 3.

Referring now to FIGS. 2–4, the structure and operation of the separator 100 will be more specifically described. A liquid/gas mixture 134 including liquid slugs 136 flowing through the pipeline 103 enters the housing 101 via the inlet 112. Upon entering the housing 101, liquid 142 in the liquid/gas mixture 134 spreads into a stratified, mostly liquid film 138 on the separation table 104.

The cross-sectional flow area on the separation table 104 is much greater than that of inlet 102 and this tends to cause the velocity of the liquid to substantially decrease. In addition, the inclined position of the separation table 104 further reduces the velocity of the liquid 142 such that the liquid film 138 does not cover the orifices 109 located near the second end 116 of the separation table 104. The resultant deceleration in the liquid phase causes the momentum of the liquid slugs 136 to dissipate and thereby prevents damage to downstream piping and equipment.

As the velocity of the liquid 142 approaches zero, previously entrained gas is released into an upper chamber 140 of the housing 101. Decelerated liquid 142 falls into a lower chamber 144 through a portion of the orifices 109 and the two overflow gaps 130, 132. The liquid then passes out of the housing 101 through the liquid outlet 108. As will be appreciated by those skilled in the art, the number of orifices 109 through which the liquid 142 passes is proportional to the velocity of the liquid/gas mixture at the inlet 112 and inversely proportional to the upper surface area and the degree of inclination of the separation table 104.

As noted, the separated gas 146 is released from the liquid/gas mixture into the upper chamber 140 as the liquid spreads over the separation table 104. The separated gas 146 flows into the lower chamber 144 through the orifices 109 and the overflow gaps 122, 124 which are not filled by the liquid 142 and out the vapor outlet 106. Consequently, the angle and surface area of the separation table 104 should be selected such that a sufficient number of orifices 109 are not blocked by the liquid 142 flowing into the lower chamber 144. Thus, the separator 100 effectively separates the liquid 142 and the gas 146 of the liquid/gas mixture and substantially eliminates the liquid slugs 136.

Figure 6:
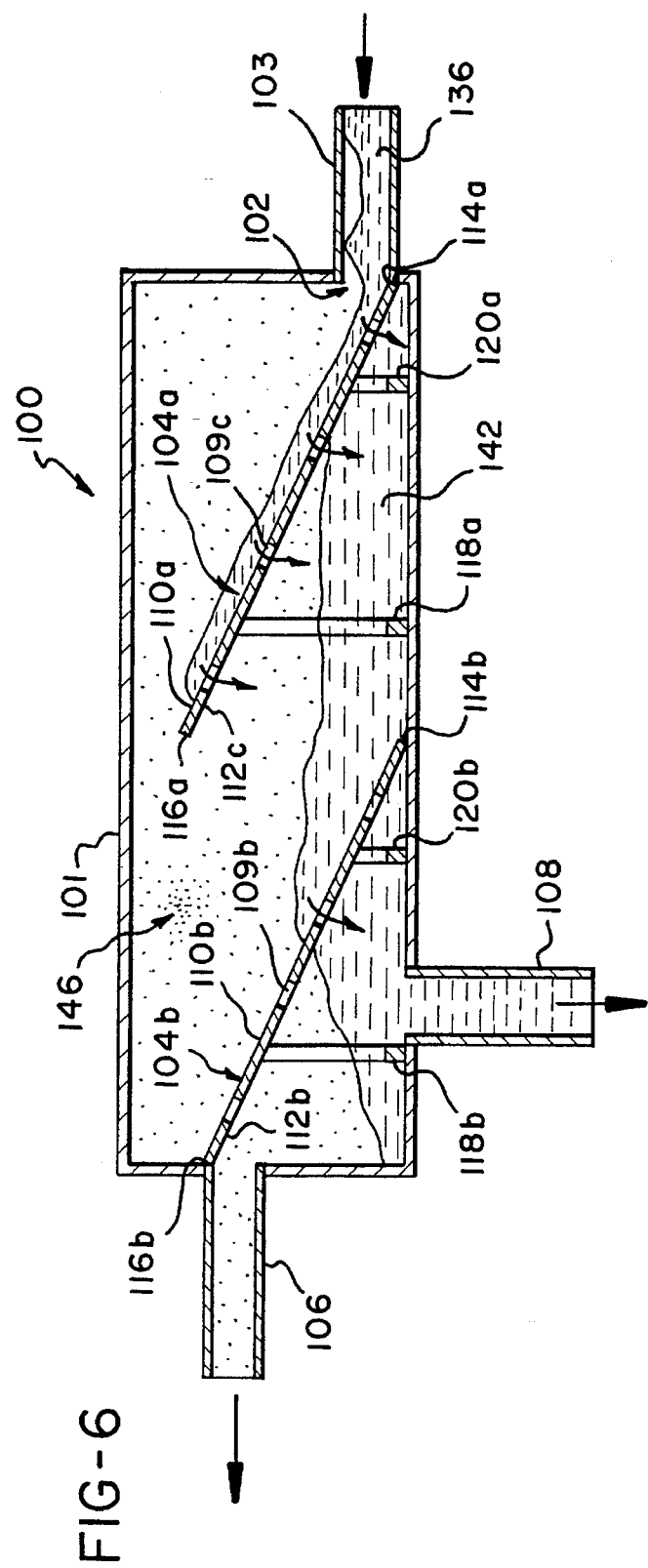
FIG. 6 is a side longitudinal sectional view of a liquid/gas separator containing a pair of separation tables in accordance with another embodiment of the present invention.

A second version of the liquid/gas separator 100, which is shown in FIG. 6, has first and second separation tables 104a, 104b contained therein. For clarity and ease of description, the separation tables 104a, 104b, and their various components are designated by reference numerals having a reference number identical to those used for the separation table 104 in the first version followed by a reference letter "a" to designate the first separation table 104a and a reference letter "b" to designate the second separation table 104b. The tables 104a, 104b have respective plurality of orifices 109a, 109b disposed therein through which liquid and gas flow. Upper surfaces 110a, 110b, first ends 114a, 114b and second ends 116a, 116b are included in the respective tables 104a, 104b. Preferably, the upper surface 110a of the first end 114a of the first table 104a abuts the bottom of the inlet 102 and the lower surface 112b of the second end 116b of the second separation table 104b abuts the top of the vapor outlet 106.

During operation, the liquid/gas mixture 134 enters the housing 101 via the inlet 102 and the liquid spreads across the first separation table 104a. Upon spreading over the first separation table 104a, the liquid decelerates and, due to the force of gravity, passes through one or more of the orifices 109a. A portion, or all, of the entrained gas in the liquid/gas mixture 134 is released into the housing 101 as the liquid spreads over the separation table 104a.

The decelerated liquid 142 next spreads over the second separation table 104b and is further decelerated. The liquid passes through one or more of the orifices 109b and exits the housing 101 via the liquid outlet 108. Any gas still entrained in the liquid is released as the liquid spreads over the second separation table 104b. The separated gas 146 passes through one or more of the orifices 109b of the second separation table 104b and exits the housing 101 through the vapor outlet 106.

While a representative embodiment and certain details have been shown for purposes of illustrating the invention, it will be apparent to those skilled in the art that various changes in the methods and apparatus disclosed herein may be made without departing from the scope of the invention, which is defined in the appended claims.

What is claimed is:

1. An apparatus for separating gas and liquid in a liquid/gas mixture flowing through a pipeline, comprising:

a housing connected to said pipeline and including at least one inlet for receiving said liquid/gas mixture from said pipeline, at least one liquid outlet for discharging said liquid from said housing, and at least one vapor outlet for discharging said gas from said housing; and at least one separation table in said housing for separating said gas and said liquid in said liquid/gas mixture, each of said at least one separation table having upper and lower surfaces, a first end positioned toward said inlet, a second end opposite said first end, and a plurality of orifices through which said liquid and said gas from said liquid/gas mixture passes, and said at least one separation table extending substantially longitudinally along said housing in an inclined position such that said first end is below said second end and said second end is above the level of liquid in said housing.

2. The apparatus as recited in claim 1 wherein said inlet and said vapor outlet are positioned at opposite ends of said housing and, wherein said at least one separation table extends substantially from said inlet to said vapor outlet within said housing.

3. The apparatus as recited in claim 2 wherein said upper surface of said first end of said separation table abuts the bottom of said inlet and said lower surface of said second end of said separation table abuts the top of said vapor outlet.

4. The apparatus as recited in claim 3 comprising at least one supporting leg for supporting said separation table in said housing.

5. The apparatus as recited in claim 4 wherein said first end of said separation table has a width which is less than the width at said second end of said separation table.

6. The apparatus as recited in claim 1 wherein said upper surface of said first end of one of said at least one separation table abuts the bottom of said inlet.

7. The apparatus as recited in claim 1 wherein said at least one separation table comprises, a first separation table for receiving said liquid/gas mixture from said inlet, and a second separation table for receiving said gas and said liquid of said liquid/gas mixture from said first separation table.

8. The apparatus as recited in claim 7 wherein said upper surface of said first end of said first separation table abuts the bottom of said inlet.

9. The apparatus as recited in claim 8 wherein said lower surface of said second end of said second separation table abuts the top of said vapor outlet.

10. The apparatus as recited in claim 9 wherein said liquid outlet is positioned beneath said second separation table.

11. The apparatus as recited in claim 10 comprising a plurality of supporting legs for supporting said first and second separation tables.

12. A method for separating a liquid and a gas in a liquid/gas mixture flowing through a pipeline, said method comprising the steps of:

providing a housing having at least one separation table therein, each of said at least one separation table having upper and lower surfaces, a first end positioned toward said inlet, a second end opposite said first end, and a plurality of orifices through which said liquid and said gas from said liquid/gas mixture passes, said at least one separation table extending substantially longitudinally along said housing in an inclined position such that said first end is below said second end and said second end is above the level of liquid in said housing;

directing said liquid/gas mixture from said pipeline onto said at least one separation table for separating said liquid and said gas of said liquid/gas mixture;

discharging said gas through at least one vapor outlet in said housing; and discharging said liquid through at least one liquid outlet in said housing.

13. The method as recited in claim 12 wherein the step of providing a housing comprises the steps of:

providing said inlet and said vapor outlet on opposite ends of said housing; and providing a separation table extending substantially from said inlet to said vapor outlet.

14. The method as recited in claim 13 wherein the step of providing a separation table comprises the step of providing said upper surface of said first end of said separation table abutting the bottom of said inlet.

15. The method as recited in claim 14 wherein the step of providing a separation table further comprises the step of providing said lower surface of said second end of said separation table abutting the top of said vapor outlet.

16. The method as recited in claim 12 wherein the step of providing at least one separation table comprises the steps of:

providing a first separation table for receiving said liquid/gas mixture from said inlet; and providing a second separation table for receiving said gas and said liquid of said liquid/gas mixture from said first separation table.

17. The method as recited in claim 16 wherein the step of providing a first separation table comprises the step of providing said upper surface of said first end of said first separation table abutting the bottom of said inlet.

18. The method as recited in claim 17 wherein the step of providing a second separation table comprises the step of providing said lower surface of said second end of said second separation table abutting the top of said vapor outlet.

* * * * *